United States Patent
Kimura et al.

(10) Patent No.: US 7,325,730 B2
(45) Date of Patent: Feb. 5, 2008

(54) SHOPPING ASSISTING CARD, CARD ISSUING SYSTEM, CARD ISSUING METHOD, CARD ISSUING PROGRAM, AND STORAGE MEDIUM

(75) Inventors: Seiji Kimura, Shiojiri (JP); Yasuhiro Nomura, Shiojiri (JP)

(73) Assignee: Seiko Epson Corporation (JP)

( * ) Notice: Subject to any disclaimer, the term of this patent is extended or adjusted under 35 U.S.C. 154(b) by 67 days.

(21) Appl. No.: 11/330,276

(22) Filed: Jan. 11, 2006

(65) Prior Publication Data

US 2006/0151600 A1   Jul. 13, 2006

(30) Foreign Application Priority Data

Jan. 12, 2005   (JP) .............................. 2005-005584

(51) Int. Cl.
*G06K 15/00* (2006.01)
(52) U.S. Cl. ...................... 235/383; 235/375; 235/380
(58) Field of Classification Search ................ 235/375, 235/380, 383; 705/16
See application file for complete search history.

(56) References Cited

U.S. PATENT DOCUMENTS

| | | | |
|---|---|---|---|
| 5,459,306 A * | 10/1995 | Stein et al. ................. 235/383 |
| 6,199,753 B1 * | 3/2001 | Tracy et al. ................. 235/375 |
| 6,313,745 B1 * | 11/2001 | Suzuki ..................... 340/572.1 |
| 6,434,530 B1 * | 8/2002 | Sloane et al. .................. 705/1 |
| 6,512,919 B2 * | 1/2003 | Ogasawara .............. 455/422.1 |
| 6,826,554 B2 * | 11/2004 | Sone ............................ 707/2 |
| 2002/0069131 A1 * | 6/2002 | Miyata et al. ................ 705/26 |
| 2003/0018522 A1 * | 1/2003 | Denimarck et al. ........... 705/14 |
| 2004/0069661 A1 * | 4/2004 | Telleen ....................... 206/232 |

* cited by examiner

*Primary Examiner*—Michael G. Lee
*Assistant Examiner*—Paultep Savusdiphol
(74) *Attorney, Agent, or Firm*—Harness, Dickey & Pierce, P.L.C.

(57) ABSTRACT

A card issuing system that issues a shopping assisting card that provides support in purchasing an item includes a database that stores customer information including a language used by a customer as registered information, item information including items sold at a store as registered information, store information including an item recommended by the store among the items included in the item information as registered information, and format data registered corresponding to a plurality of languages and used for producing the shopping assisting card, a data extracting unit that extracts format data corresponding to the language used by the customer and the item recommended by the store from the database, a data producing unit that produces printing data for the shopping assisting card introducing the item recommended by the store in the language used by the customer based on the format data, and a printer that prints the shopping assisting card based on the printing data.

4 Claims, 5 Drawing Sheets

SHOPPING ASSISTING CARD, CARD ISSUING SYSTEM, CARD ISSUING METHOD, CARD ISSUING PROGRAM, AND STORAGE MEDIUM

BACKGROUND

1. Technical Field

The present invention relates to a shopping assisting card to be presented to a customer visiting a retailer store before the customer's purchase of an item, a card issuing system, a card issuing method, and a card issuing program, and a storage medium therefor.

2. Related Art

It has been daily practice for salesclerks at retailer stores to make sales talk and encourage customers to buy more items in addition to those already purchased by the customers or to introduce information that would lead to purchase of other items. Promotional sales activities are not limited to such sales talk by the clerks and include various other approaches such as recording information of other items together with the receipt information of a purchased item on the receipt.

Such activities are usually targeted at customers who have already bought items mainly in an attempt to provide support information when the customers revisit the stores. However, if the customers do not visit the stores for a long while, they usually do not remember the content of the sales talk or items then introduced to them by the clerks, or if they do, the items themselves have been sold out in most cases. In this sense, the stores could not provide timely shopping support information to the customers visiting them. It would be harder for stores abroad to provide sufficient service before purchase for difficulties by language barriers in addition to the above-described reason.

SUMMARY

An advantage of some aspects of the invention is to provide a shopping assisting card that can provide a customer visiting a store with timely and high-value added shopping support information, a card issuing system, a card issuing method, a card issuing program, and a storing medium therefor.

A card issuing system according to a first aspect of the invention issues a shopping assisting card that provides support in purchasing an item. The system includes a database that stores customer information including a language used by a customer as registered information, item information including items sold at a store as registered information, store information including an item recommended by the store among the items included in the item information as registered information, and format data registered corresponding to a plurality of languages and used for producing the shopping assisting card, a data extracting unit that extracts format data corresponding to the language used by the customer and the item recommended by the store from the database, a data producing unit that produces printing data for the shopping assisting card introducing the item recommended by the store in the language used by the customer based on the format data, and a printer that prints the shopping assisting card based on the printing data.

In this way, the shopping assisting card introducing the item recommended by the store in the language used by the customer is printed, so that the customer can make use of the card as a material to refer to when contemplating the purchase of an item. In such an occasion, since the card is printed in the language used by the customer, the customer can shop by referring to the card even at a store abroad where a language different from the customer's language is used. Therefore, according to the aspect, the customer visiting the store can be provided with timely and high-value added shopping support information and more strongly motivated to purchase the item.

In the above-described system, the item information may include at least the item name data, price data, and image data of the items as registered information. The shopping assisting card may be printed with at least the item name, price, and item image of the recommended item.

In this way, the recommended item is introduced by the item image together with the item name and price printed on the shopping assisting card, so that the customer can easily grasp the general idea of the item. In this way, the customer may be more strongly motivated to purchase the item.

In the above-described system, the store information may include map information indicating the location of the items in the store as registered information, and the shopping assisting card may be printed with a map indicating the location of the recommended item.

In this way, the location of the recommended item may be printed on the shopping assisting card, which makes it easier for the customer to search for the item. Therefore, the customer can be provided with higher-value added service.

The above-described system may further include a rate converter that produces a rate conversion table between the currency of the customer's country and a foreign currency used at the store based on an exchange rate between these currencies, and the shopping assisting card may be printed with the recommended item and the rate conversion table.

In this way, the shopping assisting card is printed with the rate conversion table having an exchange rate between the currency of the customer's country and a foreign currency, so that the customer can smoothly shop at a store abroad without being puzzled by the difference between the currency units.

In the above-described system, the item may be an apparel product, the customer information may include size information of the item for each customer, and the shopping assisting card may be printed with the size information.

In this way, the shopping assisting card is printed with the size information of the apparel product for the customer, so that the customer can smoothly shop without feeling uncertain about the item size. Therefore, the customer can be provided with high-value added service.

The above-described system may further include a size converter that converts the size unit of the size of the apparel product registered as the customer information into another size unit used at the store. The shopping assisting card may be printed with the size information in the size unit after the size conversion.

In this way, the size of the apparel product is represented by the size unit used in the area of the store, so that the customer can smoothly shop without being puzzled about the difference between the size units.

In the above-described system, an item searched for and found in the item information based on the size information of each of the customers may be extracted as the recommended item.

In this way, a recommended item having a size matching the size of the customer is printed on the shopping assisting card, so that the customer can purchase an appropriate apparel item having a size matching the size of the customer.

In the above-described system, the customer information may include purchase inclination information indicating the inclination of each customer in purchasing the apparel item as registered information, and an item searched for and found in the item information based on the purchase inclination information may be extracted from the item information as the recommended item.

In this way, the recommended item printed on the shopping assisting card reflects the purchase inclination of each customer, so that an item more appropriated for the customer can be presented.

In the above-described system, the customer information may include purchase record information indicating the purchase record of items by the customer as registered information. An item searched for and found in the item information based on the purchase record information may be extracted as the recommendation item.

In this way, the recommended item printed on the shopping assisting card reflects the purchase record of the customer, so that an item more appropriate for the customer can be presented.

A shopping assisting card according to a second aspect of the invention provides support in purchasing an item, and the card is printed with information related to an item recommended by a store and a rate conversion table produced based on an exchange rate between the currency of the customer's country and a foreign currency written in a language used by the customer.

In this way, the shopping assisting card introducing the item recommended by the store in the language used by the customer is printed, so that the customer can make use of the card as a material to refer to when contemplating the purchase of an item. In such an occasion, since the card is printed in the language used by the customer, the customer can shop by referring to the card even at a store abroad where a language different from the customer's language is used. In addition, according to the aspect, the shopping assisting card is printed with the rate conversion table having an exchange rate between the currency of the customer's country and a foreign currency, so that the customer can smoothly shop at a store abroad without being puzzled by the difference between the currency units.

A method of issuing a shopping assisting card according to a third aspect of the invention provides support in purchasing an item by a computer system. The system includes a database that stores customer information including a language used by a customer as registered information, item information including items sold at a store as registered information, store information including an item recommended by the store among the items included in the item information as registered information, and format data registered corresponding to a plurality of languages and used for producing the shopping assisting card. The method includes extracting format data corresponding to the language used by the customer and the item recommended by the store from the database, producing printing data for the shopping assisting card introducing the item recommended by the store in the language used by the customer based on the format data, and printing the shopping assisting card based on the printing data.

According to this method, the shopping assisting card introducing the item recommended by the store in the language used by the customer is printed, so that the customer can make use of the card as a material to refer to when contemplating the purchase of an item. In such an occasion, since the card is printed in the language used by the customer, the customer can shop by referring to the card even at a store abroad where a language different from the customer's language is used. Therefore, according to the method, the customer visiting the store can be provided with timely and high-value added shopping support information and more strongly motivated to purchase the item.

A card issuing program according to a fourth aspect of the invention enables a computer system to issue a shopping assisting card that includes support information for purchasing an item. The system includes a database that stores customer information including a language used by a customer as registered information, item information including items sold at a store as registered information, store information including an item recommended by the store among the items included in the item information as registered information, and format data registered corresponding to a plurality of languages and used for producing the shopping assisting card. The program enables a computer to carry out extracting format data corresponding to the language used by the customer and the item recommended by the store from the database, producing printing data for the shopping assisting card introducing the item recommended by the store in the language used by the customer based on the format data, and printing the shopping assisting card based on the printing data.

According to this program, the shopping assisting card introducing the item recommended by the store in the language used by the customer is printed, so that the customer can make use of the card as a material to refer to when contemplating the purchase of an item. In such an occasion, since the card is printed in the language used by the customer, the customer can shop by referring to the card even at a store abroad where a language different from the customer's language is used. Therefore, according to the program, the customer visiting the store can be provided with timely and high-value added shopping support information and more strongly motivated to purchase the item.

A storage medium storing a card issuing program according to a fifth aspect of the invention enables a computer system to issue a shopping assisting card including support information for purchasing an item. The system includes a database that stores customer information including a language used by a customer as registered information, item information including items sold at a store as registered information, store information including an item recommended by the store among the items included in the item information as registered information, and format data registered corresponding to a plurality of languages and used for producing the shopping assisting card. The program enables a computer to carry out extracting format data corresponding to the language used by the customer and the item recommended by the store from the database, producing printing data for the shopping assisting card introducing the item recommended by the store in the language used by the customer based on the format data, and printing the shopping assisting card based on the printing data.

According to the program provided by the storage medium, the shopping assisting card introducing the item recommended by the store in the language used by the customer is printed, so that the customer can make use of the card as a material to refer to when contemplating the purchase of an items. In such an occasion, since the card is printed in the language used by the customer, the customer can shop by referring to the card even at a store abroad where a language different from the customer's language is used. Therefore, the customer visiting the store can be provided with timely and high-value added shopping support information and more strongly motivated to purchase the item.

BRIEF DESCRIPTION OF THE DRAWINGS

The invention will be described with reference to the accompanying drawings, wherein like numbers reference like elements.

DESCRIPTION OF EXEMPLARY EMBODIMENTS

Now, an application of the invention to a store that sells apparel products will be described as one embodiment with reference to the accompanying drawings.

Figure 1:
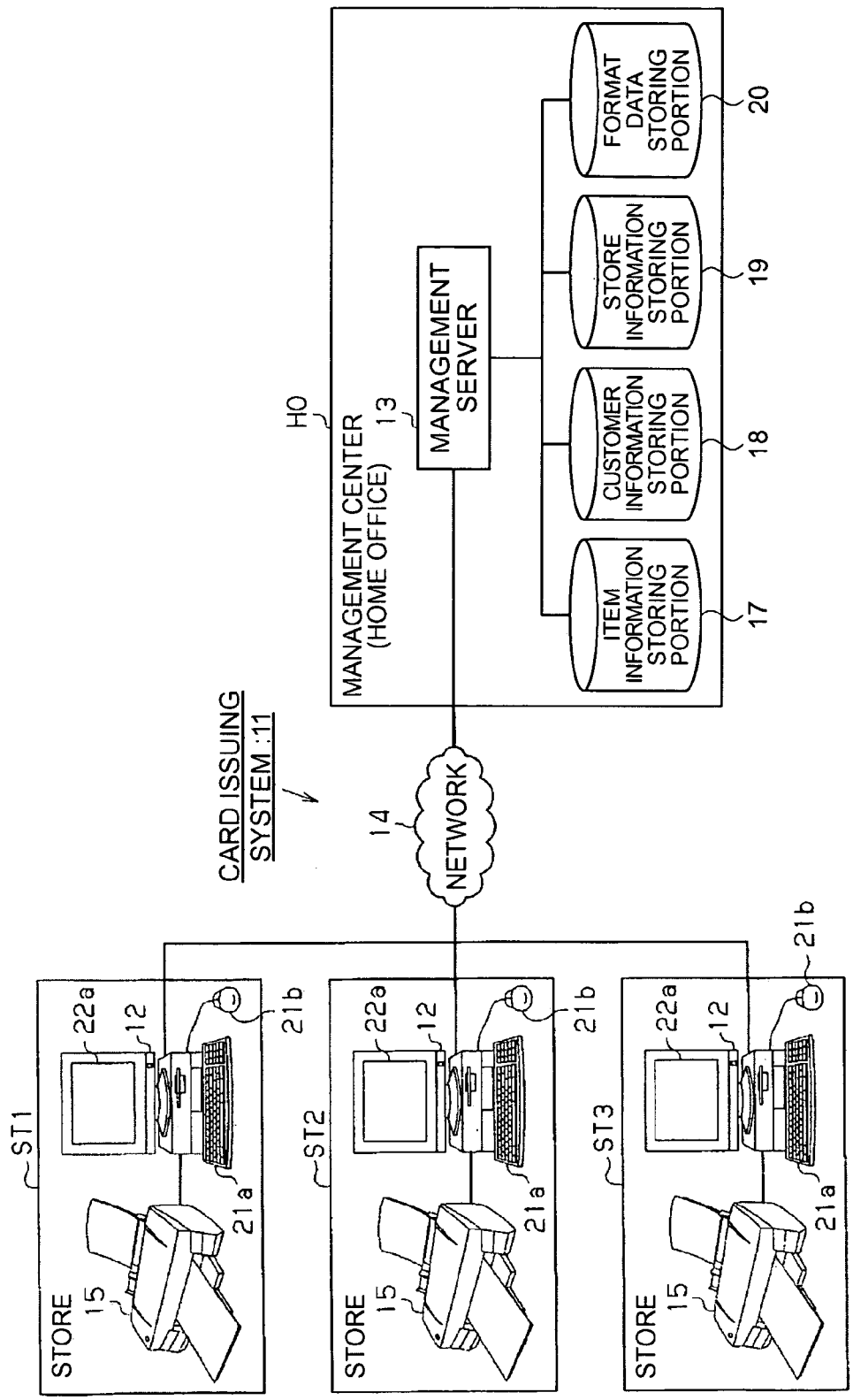
FIG. 1 is a schematic illustration of a card issuing system according to one embodiment of the invention.

FIG. 1 is a schematic illustration of a card issuing system 11 according to the embodiment. The card issuing system 11 (computer system) manages information such as customer information and item information the will be described using a database in the computer, and produces a shopping assisting card 200 (FIG. 5B). The system is constructed based on a client/server relational type data model in this example.

The card issuing system 11 includes a store terminal 12 serving as a client computer provided at a store ST and a management server 13 as a server computer provided at a management center (home office) HO. The store terminal 12 and the management server 13 are connected with each other by a network 14 (such as the Internet).

Various server functions such as those of a Web server and an FTP server are integrated in the management server 13, and data is exchanged between the management server 13 and the store terminal 12 according to a prescribed communication protocol (such as TCP/IP). Note that according to the embodiment, the server functions are integrated in a single device, while the distribution/integration of the server functions is not limited to this manner, and all or part of the server functions can be functionally or physically distributed/integrated depending on a load or the like, so that the functions can be implemented on an arbitrary unit basis. According to the embodiment, the management server 13 (server computer) is provided only at the home office HO of the stores ST, so that processing requests from a plurality of store terminals 12 (client computers) are received by the single management server 13. However, a plurality of such management servers 13 may be provided (for example for every country having a store ST), so that the processing can be distributed.

The store terminal 12 is made of for example a personal computer and provided at each of the stores ST (three stores ST1 to ST3 shown as an example in FIG. 1). The store terminals 12 are each connected with a printer 15 as printing means. The printer 15 is for example a color ink jet printer and prints (in color) a shopping assisting card 200 that provides support information for use in purchasing an item as shown in FIG. 5B based on the printing data produced by the store terminal 12.

Figure 5A:
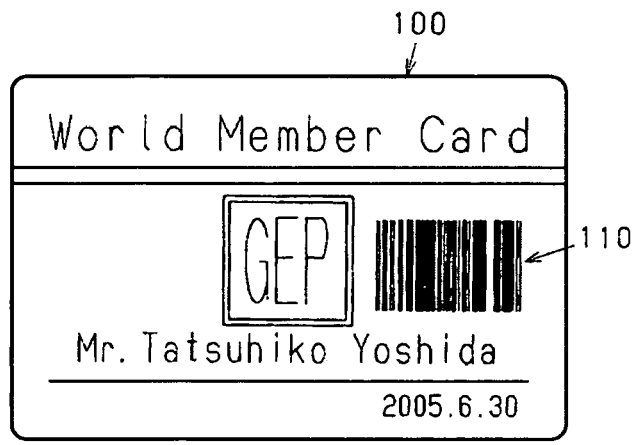
FIG. 5A is a schematic view of an example of a member card.
Figure 5B:
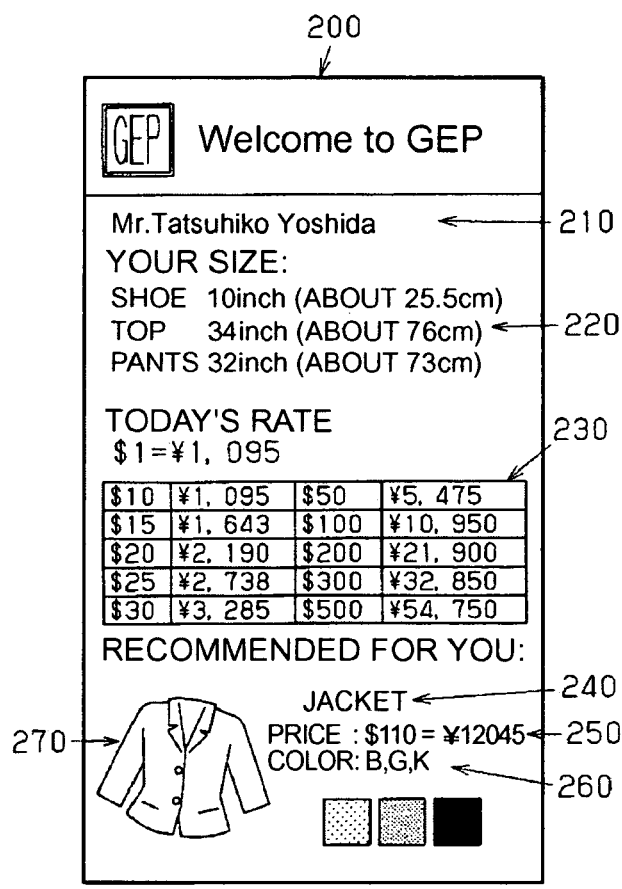
FIG. 5B is a schematic view of an example of a shopping assisting card.

The store terminal 12 is further connected with a reader 16 (see FIG. 2) serving as means for reading an ID code 110 attached to a member card 100 as shown in FIG. 5A. The reader 16 is a barcode reader that can read an ID code 110 consisting of a barcode (one-dimensional code) in this example.

The management server 13 is connected with an item information storing portion 17, a customer information storing portion 18, a store information storing portion 19, and a format data storing portion 20 constructed as databases. Note that according to the embodiment, the storing portions 17 to 20 are distributed on a function-basis, but they may be distributed in other ways.

The item information storing portion 17 stores item information of items sold at each store ST. The item information includes item codes, item data, price data, and image data in this example. The item code is data used to identify the item and consists of a number having a prescribed number of digits. The item data indicates the name of item (item name data) and consists of a character text. Note that other kinds of information such as color and size are registered as the item data in addition to the item name data. The price data indicates the price of the item and consists of a number. Image data is a color photograph image of the item or a general image (color image) representing the item. Note that the contents of the item information (item codes, item data, price data, and image data) registered in the item information storing portion 17 are subjected to addition and subtraction as required every time a new item is added or an item is removed at each of the stores ST.

The customer information storing portion 18 stores information on customers that visit and shop at the stores ST. The customer information includes member codes and member data in this example. The member code is data used to identify a customer (member) pre-registered as a member and consists of a number having a prescribed number of digits. The member code is registered in association with the ID code 110 of the member card 100 (FIG. 5A). The member data consists of a character text registered based on information input by a customer when the customer is registered as a member. The data includes information such as the name, age, sex, and address. The member data also includes registered information on the customer's shopping inclination about apparel products (such as the life style, the preference in coordination, and the favorite colors of the customer), size information regarding apparel products (such as the sizes of shoe, top, and pants), and the language used by the customer (the customer's mother tongue). Note that the purchase record information indicates the record of items purchased by the customer in the past, and the information is registered for example by associating the member code with the item codes.

The store information storing portion 19 stores store information on a store ST basis. The store information includes a store code and recommendation data in this example. The store code is data used to identify each store ST (stores ST1 to ST3) and consists of a number having a prescribed number of digits. The recommendation data indicates an item independently recommended by each of the stores ST1 to ST3 (recommended item) or items sold at discounted prices (discounted items) by each of the stores ST1 to ST3 depending on the amounts of items in stock among the items registered in the item information storing portion 17 described above. These kinds of data are registered by associating one or more items with a store code. Note that the store information registered in the store information storing portion 19 can be increased or deleted as required by the store terminals 12 at the stores ST1 to ST3.

The format data storing portion 20 stores data related to formats (format data) for producing shopping assisting cards 200. According to the embodiment, various kinds of data corresponding to a plurality of languages are independently registered, so that a shopping assisting card in a language used by each customer is produced based on a corresponding kind of format data.

Figure 2:
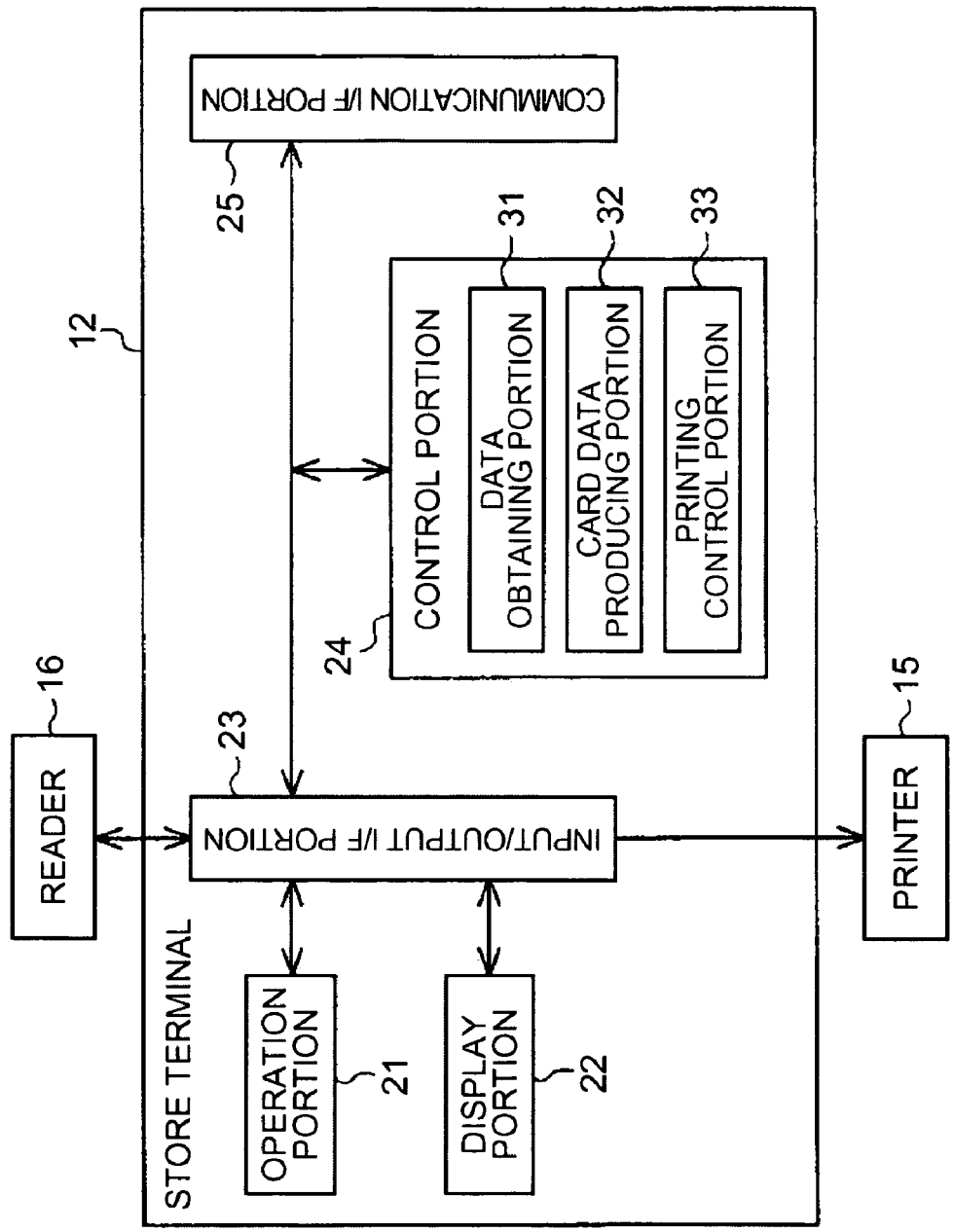
FIG. 2 is a block diagram of a general hardware configuration of a store terminal.

FIG. 2 is a block diagram of a schematic hardware configuration of the store terminal 12.

The store terminal 12 includes an operation portion 21, a display portion 22, an input/output interface (hereinafter as "I/F") portion 23, a control portion 24, and a communication I/F portion 25.

The input I/F portion 23 controls data exchange between the operation portion 21 and the display portion 22 and between the printer 15 and the reader 16. The operation portion 21 includes for example a keyboard 21a and a mouse 21b (see FIG. 1), and these elements are used by clerks at the stores ST to input various kinds of information or instructions. The display portion 22 is made of a monitor 22a such as a CRT and an LCD (see FIG. 1) and displays a screen image for a clerk to view and carry out processing or a screen image for indicating a result of processing. The communication I/F portion 25 controls communication between the store terminal 12 and a network 14 through a communication device such as a router that is not shown.

The control portion 24 includes a CPU, a ROM, and a RAM (not shown), and in terms of functional concept, it has a data obtaining portion 31, a card data producing portion 32, and a printing control portion 33. A program executed by the CPU for implementing processing in each of the functional portions (31 to 33) is stored in the ROM and the CPU executes processing according to the program using the RAM as an operation region such as a buffer.

The data obtaining portion 31 transmits, to the management server 13, the ID code 110 (barcode information in this example) of the member card 100 read by the reader 16 and the store code of the store ST. Using the ID code 110 and the store code as a key, data necessary for producing a shopping assisting card 200 according to the embodiment . is obtained from the management server 13, and the obtained data is transferred to the card data producing portion 32.

The card data producing portion 32 receives the data obtained by the data obtaining portion 31 and produces image data of a shopping assisting card 200 by carrying out necessary image-processing to the received data. In this example, as shown in FIG. 5B, the card data producing portion 32 produces image data of a shopping assisting card 200 printed with the name 210 of a customer, the size 220 of apparel products for the customer, a rate conversion table 230 produced based on a exchange rate that will be described, and the item name 240, price 250, color 260, and item image 270 of a recommended item to the customer.

The printing control portion 33 is a processing portion that converts the image data produced by the card data producing portion 32 into printing data that can be handled by the printer 15 and has the data printed by the printer 15 on a printing medium. In this way, the shopping assisting card 200 is printed.

Figure 3:
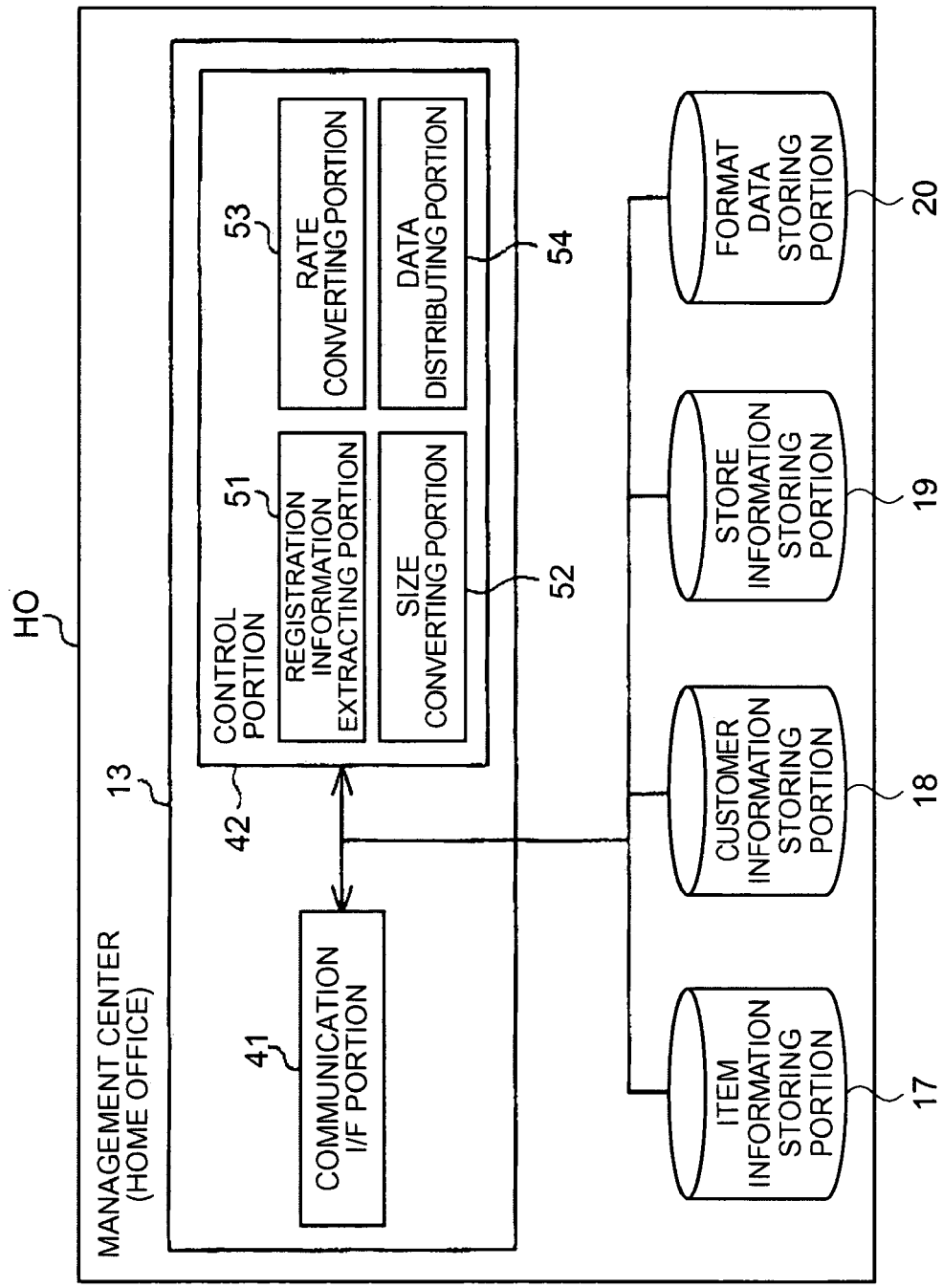
FIG. 3 is a block diagram of a general hardware configuration of a management server.

FIG. 3 is a block diagram of a general hardware configuration of the management server 13.

The management server 13 includes a communication I/F portion 41 and a control portion 42. The communication I/F portion 41 controls two-way communication with the network 14 through a communication device such as a router that is not shown. The control portion 42 includes a CPU, a ROM, and a RAM (not shown) and has a registration information extracting portion 51, a size converting portion 52, a rate converting portion 53, and a data distributing portion 54 in terms of functional concept. Note that a program executed by the CPU for implementing the processing in each of functional portions (51 to 54) is stored for example in the ROM, and the CPU executes the processing according to the program using the RAM as an operation region such as a buffer.

The registration information extracting portion 51 is a processing portion that extracts necessary data to be transmitted to the store terminal 12 from the storing portions 17 to 20 based on the ID code 110 and the store code received from the store terminal 12. More specifically, the member data of the customer is extracted from the customer data information storing portion 18 based on the member code determined from the ID code 110 and recommendation data by the store ST (item code associated with the store code) is extracted from the store information storing portion 19 based on the store code. Then, the item information of the item registered as the recommendation data (item data, price data, and image data) is extracted from the item information storing portion 17.

The registration information extracting portion 51 extracts format data corresponding to the language used by the customer registered as the member data from the format data storing portion 20. As shown in FIG. 5B, if for example the language used by the customer registered as the member data is Japanese, the registration information extracting portion 51 extracts format data for producing a shopping assisting card 200 in Japanese from the format data storing portion 20.

The size converting portion 52 is a processing portion that converts a size unit in size information for a product registered as the member data into another size unit used for example by a store ST abroad. When for example the size unit for a product registered as the member data is "cm (centimeter)" and the size unit for a product used by a store ST in a certain area is "inch," the size converting portion 52 converts the size by "cm" into "inch" as shown in FIG. 5B.

The rate converting portion 53 is a processing portion that produces a rate conversion table between the currency of the country of a customer and a currency (foreign currency) used at a store ST abroad based on the exchange rates between the currencies. Format data for producing the rate conversion table is for example stored in a ROM, and for example as shown in FIG. 5B, the rate converting portion 53 produces a conversion table between the currency of the customer's country "\ (Yen)" and a foreign currency "$ (dollar)" based on the exchange rate at the time point (at the time of producing the table). Note that data indicating exchange rates among currencies of countries is for example stored in a ROM, and the data is automatically updated periodically (at regular time intervals).

The data distributing portion 54 is a processing portion that distributes, to the store terminal 12, member data, item data, price data, image data, and format data for producing a card extracted by the registration information extracting portion 51, size information after size conversion by the size converting portion 52, and a rate conversion table produced by the rate converting portion 53.

Figure 4:
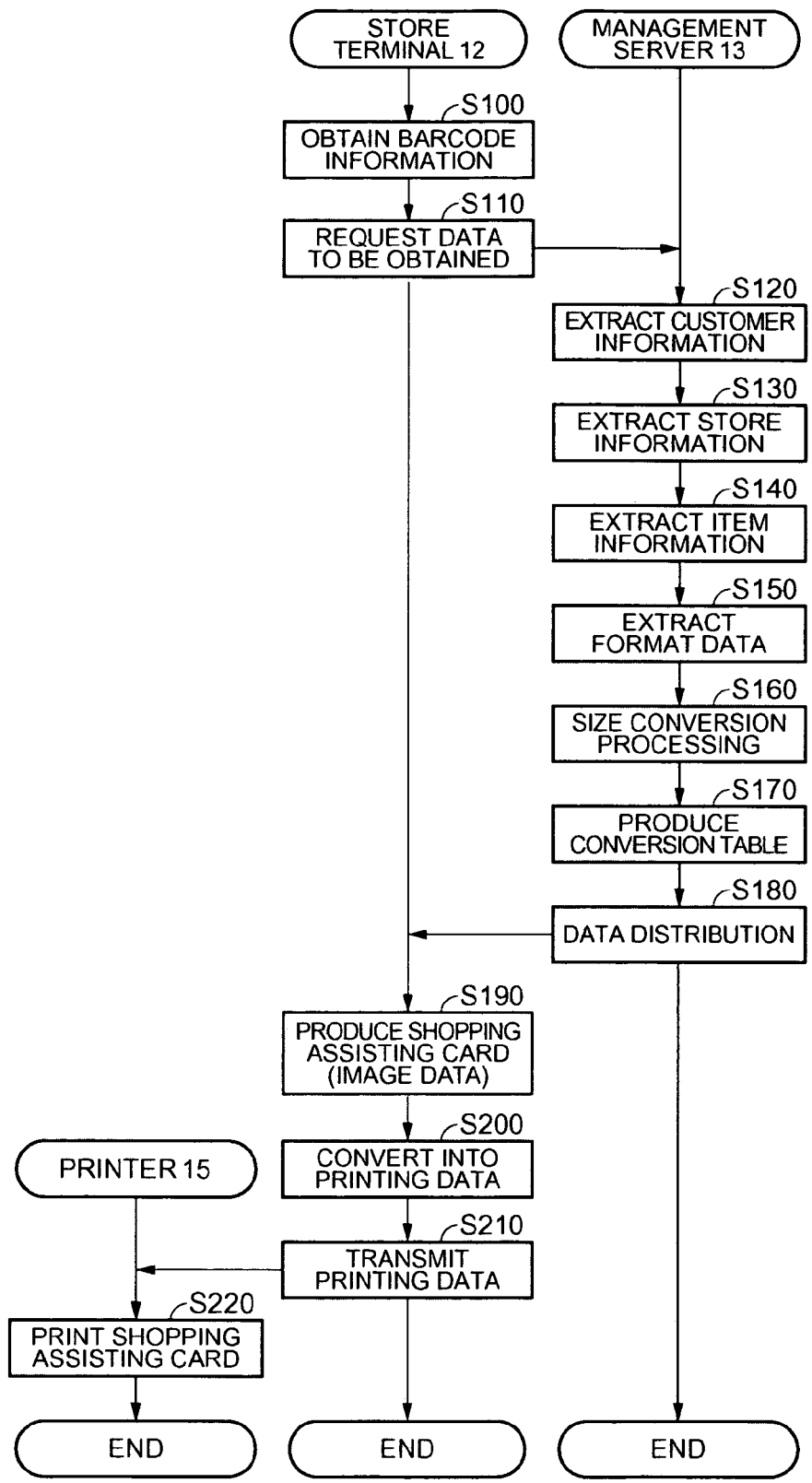
FIG. 4 is a flowchart for use in illustrating processing in a card issuing system.

FIG. 4 is a flowchart showing the processing of the card issuing system 11 according to the embodiment.

In step 100, the store terminal 12 obtains an ID code 110 (barcode information) read by the reader 16. Then in step S110, the terminal transmits the ID code 110 and the store code of the store ST to the management server 13 and makes a data obtaining request using these codes as a key.

The management server 13 receives the ID code 110 and the store code from the store terminal 12, and then in step S120, extracts the member data of the customer (customer information) from the customer information storing portion 18 based on the member code determined based on the ID code 110. In step S130, the recommendation data of the store ST (store information) is extracted from the store information storing portion 19 based on the store code.

Then in step S140, the item data, price data, and image data (item information) of the item corresponding to the item code registered as the recommendation data is extracted from the item information storing portion 17. In step S150, format data corresponding to the language used by the customer registered as the member data is extracted from the format data storing portion 20.

Then in step S160, size converting processing is carried out to convert the size unit of a product registered as the member data into the product size unit used at the store ST. In step S170, a rate conversion table is produced for the currency of the customer's country and the foreign currency based on an exchange rate between these currencies at the time. In step S180, in the data extracted/produced in steps S120 to S170 described above, data necessary for producing a card is distributed to the store terminal 12.

The store terminal 12 receives these kinds of data from the management server 13, and then in step S190, carries out necessary image processing to the received data to produce image data for the shopping assisting card 200 to be issued. In step S200, the image data is converted into printing data that can be handled by the printer 15, and in step S210, the printing data is transmitted to the printer 15.

The printer 15 carries out printing processing to a prescribed medium based on the printing data thus received from the store terminal 12 (step S220), so that the shopping assisting card 200 as shown in FIG. 5B is printed.

Now, the characteristic of the shopping assisting card 200 (FIG. 5B) issued by the above described card issuing system 11 will be described.

The shopping assisting card 200 is produced in the language used by the customer (mother tongue). In this way, when the customer visits a store ST abroad and does not understand the language used in the place, the customer can have the card 200 printed in the store, carry it and make use of the card as a material to refer to when contemplating the purchase of an item.

The shopping assisting card 200 indicates the size 220 of apparel products for the customer. In this way, the customer can smoothly shop without feeling uncertain about the size of items. It is particularly noted that the size 220 is indicated not only by the size unit (such as cm) registered as the member data but also by the size unit used at the store ST in the area (such as inch). In this way, the customer can smoothly shop without feeling uncertain about the size of items at the store ST abroad. Note that in the shopping assisting card 200 according to the embodiment, the size 220 is represented by both the unit size (such as cm) registered as the member data and the size unit obtained after size conversion (such as inch). However, it is not always necessary to represent the size by both these unit sizes, and the size 220 needs only be printed by the unit size after size conversion.

In the shopping assisting card 200, a rate conversion table 230 indicates the current exchange rate between the currency of the customer's country and a foreign currency at the time. In this way, the customer can shop at a store ST abroad without being puzzled by the difference between the currency units.

As described above, according to the embodiment, the following advantages are brought about.

(1) A customer can receive a shopping assisting card 200 printed in a language used by the customer and including an item recommended by a store ST simply by producing a member card 100 to a clerk at the store ST. In this way, the customer can make use of the shopping assisting card 200 when contemplating the purchase of an item.

(2) The recommended item is printed and introduced in the language used by the customer, so that the customer can shop at a foreign store ST by referring to the shopping assisting card 200 even if the customer does not understand the language used in the place.

(3) The recommended item is introduced by the item image 270 together with the item name 240 and the price 250, so that the customer can easily grasp the general idea of the item. In this way, the customer may be more strongly motivated to purchase the item.

(4) The shopping assisting card 200 is printed with the rate conversion table 230 having an exchange rate between the currency of the customer's country and a foreign currency, so that the customer can shop without being puzzled by the difference between the currency units at a store ST abroad.

(5) The shopping assisting card 200 is printed with the size 220 of apparel products for the customer, so that the customer can shop without feeling uncertain about the size of items.

(6) The size 220 of apparel products is represented by the size unit used at each store ST, so that the customer can smoothly shop without feeling uncertain about the size of items at a store ST abroad.

Note that according to the above described embodiment, modifications having changes as follows can be employed.

Modification 1

In the card issuing system 11 according to the above described embodiment, the function of the store terminal 12 and the function of the management server 13 may be implemented in a single computer. The card issuing system 11 can also be implemented by installing a program for issuing cards (card issuing program) in a plurality of computers. Note that the card issuing program in the above-described embodiment and Modification 1 is provided as it is stored in a portable medium such as a flexible disk and a CD-ROM, or the main memory or sub memory of another computer connected through a network. The provided program is loaded directly into the main memory of the computer or copied or installed into the sub memory from the portable medium and then loaded into the main memory for execution. When the program is provided as it is stored in another device connected by a network, the program is received from the device through the network, then copied or installed in the sub memory, and then loaded into the main memory for execution.

Modification 2

According to the above described embodiment, a recommended item to be printed on the shopping assisting card 200 is extracted from the database based on the recommendation data previously registered as the store information, but the method of extracting such a recommended item is not limited to this method. For example, based on another kind of information (such as purchase inclination information, purchase record information, and size information) registered as the member data, an item to be recommend may be extracted from item stock information managed on a store ST basis. More specifically, an item may be searched for based on the coordination inclination, favorite color, and the like of the customer registered as purchase inclination information. Alternatively, an item in association with purchase in the past (such as a new version of an item purchased in the past) may be searched for based on the purchase record of the customer registered as the purchase record information, or an item matching the customer's size may be searched for based on the product size registered as the size information. In this way, a recommended item can be extracted. When for example a Japanese customer goes shopping for apparel products abroad, it is often the case that the customer has to give up an item if its design appeals to the customer because there are hardly items matching typical Japanese sizes. However, as in Modification 2, if an item to be recommended is extracted among items carried in stock and matching the size of the customer, an item appropriate for each customer can be recommended, and the above described problem can be solved.

Modification 3

According to the above described embodiment, format data corresponding to a number of languages is registered in the management server 13 in the form of image data, and format data to be transmitted to a store terminal 12 may be transmitted as image data. In this way, the possibility of receiving garbled characters that could happen by transmitting the format data as text data can suitably be reduced.

Modification 4

According to the above described embodiment, the barcode as a one-dimensional code is used as the ID code 110 stored as the member code 100, but the invention is not limited to this and for example a two-dimensional code (such as QR code® (registered trademark)) may be used as the ID code 110.

Modification 5

According to the above described embodiment, the ID code 110 is read by the reader 16, but the member code can directly be input to the store terminal 12.

Modification 6

According to the above described embodiment, map information indicating the location of items in each store may be registered as store information and the shopping assisting card 200 may be printed with a map indicating the location of a recommended item. This makes it easier for the customer to search for the item.

Modification 7

The shopping assisting card according to the invention is not limited to the form of the shopping assisting card 200 according to the embodiment. For example, the size 220 of apparel products does not have to be printed.

Modification 8

It is understood that according to the embodiment, the invention is applied to the stores ST selling apparel products, but the invention is not limited to this example. As another example of application, the system according to the invention may be employed at an airport duty free shop. In this case, for example the shopping assisting card may be printed with a map indicating the location where formalities for duty-free shopping are performed as support information for purchasing items.

Modification 9

Matters of design in the structures in the above-described embodiment and each of the modifications may be changed as required within the scope of the technical idea of the invention.

The entire disclosure of Japanese Patent Application No. 2005-005584, filed Jan. 12, 2005 is expressly incorporated by reference herein.

What is claimed is:

1. A card issuing system that issues a shopping assisting card that provides support in purchasing an item being an apparel product, comprising:
    a database that stores customer information including a language used by a customer as registered information, item information including items sold at a store as registered information, store information including an item recommended by the store among the items included in the item information as registered information, and format data registered corresponding to a plurality of languages and used for producing the shopping assisting card, the item information including name data, price data, and image data of the items sold at the store, the customer information including size information for the customer, purchase inclination information for the customer, and purchase record information for the customer;
    a data extracting unit that extracts format data corresponding to the language used by the customer and the item recommended by the store from the database, the item being recommended based on the size information, the purchase inclination information and the purchase record information;
    a size converter that converts a size unit of the size information registered as the customer information into another size unit used at the store;
    a data producing unit that produces printing data for the shopping assisting card based on the format data, the card introducing the item recommended by the store in the language used by the customer; and
    a printer that prints the shopping assisting card based on the printing data;
    wherein the shopping assisting card is printed with name data, price data, and image data corresponding to the recommended item, and with the size information in the size unit after the size conversion and wherein the data corresponding to the language used by the customer includes image data for characters in the language used by the customer.

2. The card issuing system according to claim 1, further comprising a rate converter that produces a rate conversion table between the currency of the customer's country and a foreign currency used at the store based on an exchange rate between these currencies, the shopping assisting card being printed with the recommended item and the rate conversion table.

3. The card issuing system according to claim 1, wherein the purchase inclination information indicates the inclination of each customer in purchasing the apparel product as registered information.

4. The card issuing system according to claim 1, wherein the purchase record information indicates the purchase record of the apparel products by each customer.

\* \* \* \* \*